(12) United States Patent
Beeaff et al.

(10) Patent No.: US 11,677,088 B2
(45) Date of Patent: Jun. 13, 2023

(54) PROCESS FOR THE MANUFACTURE OF A SOLID OXIDE MEMBRANE ELECTRODE ASSEMBLY

(71) Applicant: COORSTEK MEMBRANE SCIENCES AS, Oslo (NO)

(72) Inventors: Dustin Beeaff, Oslo (NO); Christian Kjølseth, Oslo (NO); Per Kristian Vestre, Oslo (NO)

(73) Assignee: COORSTEK MEMBRANE SCIENCES AS, Oslo (NO)

(*) Notice: Subject to any disclaimer, the term of this patent is extended or adjusted under 35 U.S.C. 154(b) by 453 days.

(21) Appl. No.: 16/341,570

(22) PCT Filed: Oct. 16, 2017

(86) PCT No.: PCT/EP2017/076350
§ 371 (c)(1),
(2) Date: Apr. 12, 2019

(87) PCT Pub. No.: WO2018/069547
PCT Pub. Date: Apr. 19, 2018

(65) Prior Publication Data
US 2021/0249674 A1 Aug. 12, 2021

(30) Foreign Application Priority Data
Oct. 14, 2016 (GB) .................... 1617494

(51) Int. Cl.
H01M 8/1004 (2016.01)
H01M 4/86 (2006.01)
(Continued)

(52) U.S. Cl.
CPC ....... H01M 8/1004 (2013.01); H01M 4/8652 (2013.01); H01M 4/8864 (2013.01);
(Continued)

(58) Field of Classification Search
CPC . H01M 4/8864; H01M 4/8889; H01M 4/9066
See application file for complete search history.

(56) References Cited

U.S. PATENT DOCUMENTS 6,068,673 A   5/2000  Bloomfield
8,845,768 B2  9/2014  Wachsman et al.
(Continued)

FOREIGN PATENT DOCUMENTS

CN  103531833 A  1/2014
CN  104157893 A  11/2014
(Continued)

OTHER PUBLICATIONS

Tong, "Solid-state reactive sintering mechanism for large-grained yttrium-doped barium zirconateproton conducting ceramics" (Year: 2010).*
(Continued)

Primary Examiner — Brian R Ohara
Assistant Examiner — Patrick Marshall Greene
(74) Attorney, Agent, or Firm — Meunier Carlin & Curfman LLC

(57) ABSTRACT

A process for the preparation of a membrane electrode assembly comprising providing, in the following layer order, (I) a green supporting electrode layer comprising a composite of a mixed metal oxide and Ni oxide; (IV) a green mixed metal oxide membrane layer; and (V) a green second electrode layer comprising a composite of a mixed metal oxide and Ni oxide; and sintering all three layers simultaneously.

20 Claims, 4 Drawing Sheets

(51) Int. Cl.
*H01M 4/88* (2006.01)
*H01M 4/90* (2006.01)
*H01M 8/1213* (2016.01)

(52) U.S. Cl.
CPC ....... *H01M 4/8889* (2013.01); *H01M 4/9066* (2013.01); *H01M 8/1213* (2013.01)

(56) References Cited

U.S. PATENT DOCUMENTS

| | | |
|---|---|---|
| 2007/0246363 A1 | 10/2007 | Eisman et al. |
| 2008/0023322 A1 | 1/2008 | Sinuc et al. |
| 2012/0012471 A1 | 1/2012 | Coelho Tsou et al. |
| 2016/0036064 A1* | 2/2016 | Tong ............... H01M 8/1246 429/489 |
| 2017/0370010 A1 | 12/2017 | Coors |
| 2018/0019493 A1* | 1/2018 | Jakus ................. B33Y 80/00 |
| 2019/0006680 A1 | 1/2019 | Mizuhara et al. |

FOREIGN PATENT DOCUMENTS

| | | |
|---|---|---|
| CN | 104269563 A | 1/2015 |
| DE | 102014214781 | 1/2016 |
| EP | 1048613 | 11/2000 |
| EP | 1730327 B1 | 12/2006 |
| EP | 2246295 | 11/2010 |
| WO | 1999/016140 | 4/1999 |
| WO | 00/14009 | 3/2000 |
| WO | 01/057945 | 8/2001 |
| WO | 01/091218 | 11/2001 |
| WO | 2009/152255 | 12/2009 |
| WO | 2009/157454 | 12/2009 |
| WO | 2012/036057 | 3/2012 |
| WO | 2014/187978 | 11/2014 |

OTHER PUBLICATIONS

International Search Report and Written Opinion issued for International Application No. PCT/EP2017/076350, dated Jan. 3, 2018.
Ciria D et al., "Mechanical degradation under hydrogen of yttrium doped barium zirconate electrolyte material prepared with NiO additive", Journal of Power Sources, Elsevier SA, CH, vol. 321, May 7, 2016 (May 7, 2016), pp. 226-232, XP029541761, ISSN: 0378-7753, DOI: 10.1016/J. J P0WSOUR.2016.05.001 p. 227, left-hand column, lines 4-8.
International Search Report and Written Opinion issued for International Application No. PCT/EP2017/076340, dated Dec. 18, 2017.
Coors, et al., "Characterization of composite cermet with 68 wt.% NiO and BaCe0. 2Zr0. 6Y0. 2O3-δ." Journal of membrane science 376.1-2 (2011): 50-55.

* cited by examiner

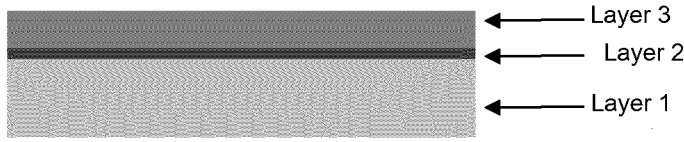
Figure 3: Planar design illustrating the support (layer 1), the membrane (layer 2) and the electrode (layer 3).
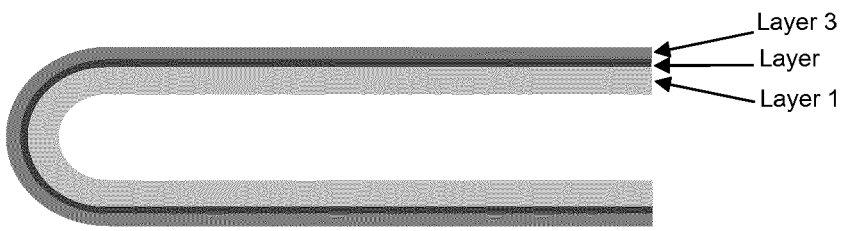
Figure 4: Tubular design illustrating the support (layer 1), the membrane (layer 2) and the electrode (layer 3).
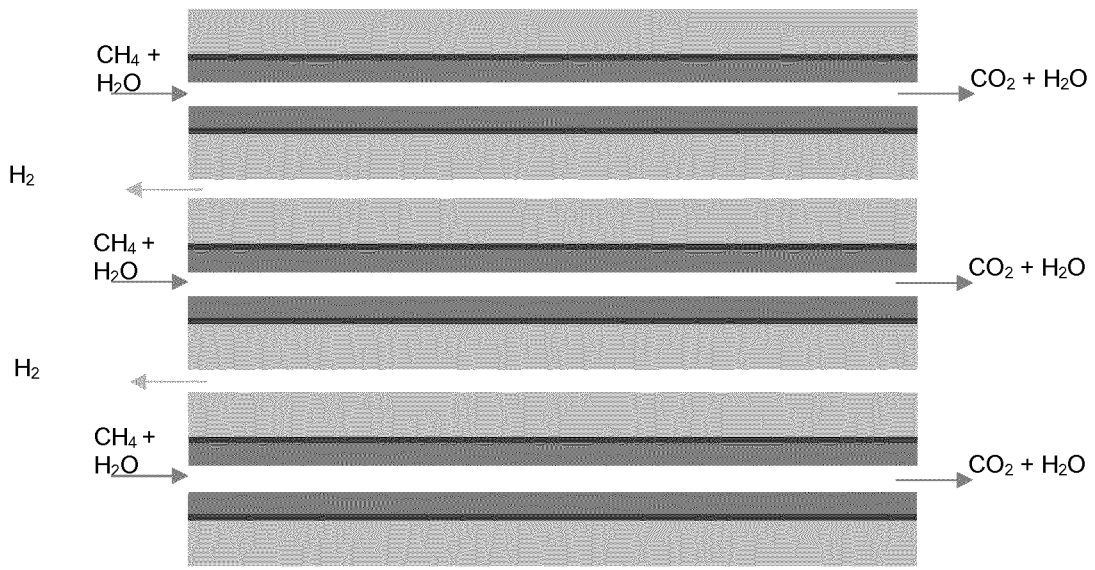
Figure 5: A simple planar reactor design alternative with a counter flow arrangement. The end product is hydrogen and $CO_2$

PROCESS FOR THE MANUFACTURE OF A SOLID OXIDE MEMBRANE ELECTRODE ASSEMBLY

FIELD OF THE INVENTION

This invention relates to a ceramic membrane electrode assembly for solid state electrochemical cells and a method for preparing the same. In particular, the invention relates to the reduction of processing steps required to produce said assembly by simultaneously sintering the layers of the assembly. The invention also relates to the use of the assembly in the dehydrogenation of a target reactant gas such as methane.

BACKGROUND OF INVENTION

Solid state electrochemical cells are used in a variety of applications, e.g. solid oxide fuel cells, solid oxide electrolysis cells, proton exchange membranes, protonic fuel cells, and membrane reactors. An electrochemical cell consists of three basic parts: an anode at which reactions occur that generate electrons, a cathode at which reactions occur that consume electrons, and an electrolyte which conducts ions but is insulating towards electrons.

Typical configurations are either in planar form, in which a flat plate is used consisting of the stacked anode/electrolyte/cathode configuration or a tubular form consisting of a cylinder of the same layers. At least one of the layers must act as a structural element to support mechanical loads during handling and operation. This assembly is referred to as the membrane electrode assembly (MEA). A generalize schematic of the architecture is show in FIG. 1.

For metal oxide-based (i.e. ceramic) electrochemical cells, the production of each layer of the MEA requires the use of thermal energy to remove organic binders, densify the layer and promote adhesion to the neighbouring component. This energy is typically applied by the use of high temperatures (>1300° C.) for a suitable period of time to allow development of the desired microstructure. As the ceramics used for electrochemical cells are not resistant to thermal shock, heating rates to the processing temperature from ambient are necessarily low (1 to 5° C./min). Thus each step incurs significant costs due to energy use and time.

A common fabrication technique is to produce a nominally thick electrolyte as one step in the production procedure and, subsequently, apply thinner electrodes in one or two steps to either side of the electrolyte. This configuration is referred to as electrolyte supported as the load bearing part of the MEA is the electrolyte. That electrolyte layer is likely to be thick, which may not be ideal for transport across the electrolyte. Another method is to co-sinter the electrolyte with one of the electrodes to form a device in which an electrode is load bearing.

Numerous patent applications involve methods for fabrication of tubular ceramic electrochemical cells. For example, WO 2001/091218 discloses a method to extrude a green anode support for electrochemical cells. The support is sintered prior to the application of electrolyte, second electrode and functional layers.

WO99/016140 discloses a method to apply on outer electrode on a tubular solid oxide fuel cell by dip coating a slurry containing the electrode materials and a solvent on to a presintered, dense electrolyte. The electrode is a dual layer electrode which is sintered before use.

Whilst the use of the electrode supported configuration is therefore known, there remain multiple steps to apply the electrolyte and a second electrode. It is therefore an object of the present invention to provide a method that permits co-sintering of the entire assembly including the second electrode, thereby reducing processing time to fabricate a MEA.

A further object of the present invention is to provide a relatively efficient method for the preparation and application of a second 'green' electrode layer to a 'green' electrolyte in an electrode-supported configuration regardless of the composition of the electrolyte.

Remarkably, after sintering the electrodes and electrolyte adhere to each other.

The inventors have realized, that in many prior art devices, the electrode materials used are often markedly different therefore requiring significantly dissimilar sintering temperatures. This is often because for most devices, one electrode operates in oxidizing conditions and the other in reducing conditions. We have appreciated that if both electrodes operate under the same conditions, e.g. both electrodes are operating under reducing conditions, a similar, or indeed the same, electrode material can be used.

A further problem with prior art devices is that the second electrode is often a single-phase material that can react with the membrane at the membrane sintering temperature to form a reaction product that degrades the device performance. One example from the solid oxide fuel cell art, is a reaction between the rare-earth ions of LSM and the zirconium of YSZ to form lanthanum zirconate which is an insulator.

In our case, the second electrode can have the same composition as the support electrode and, thus, exhibits similar sintering behavior. Moreover, our electrode can comprise a composite material which is similar to or the same as the composite material used in the membrane layer, thus avoiding any reaction between layers. This means that we can sinter all three layers simultaneously.

SUMMARY OF THE INVENTION

Thus, viewed from one aspect the invention provides a process for the preparation of a membrane electrode assembly comprising providing, in the following layer order,
(I) a green supporting electrode layer comprising a composite of a mixed metal oxide and Ni oxide;
(II) a green mixed metal oxide membrane layer; and
(III) a green second electrode layer comprising a composite of a mixed metal oxide and Ni oxide; and sintering all three layers simultaneously, e.g. in a single step.

Viewed from another aspect the invention provides a process for the preparation of a membrane electrode assembly comprising
(I) providing a green mixed metal oxide membrane layer on a green supporting electrode layer, said supporting electrode layer comprising a composite of a mixed metal oxide and Ni oxide;
(II) coating onto said green mixed metal oxide membrane layer, a green second electrode layer, said second electrode layer comprising a composite of a mixed metal oxide and Ni oxide; and
(III) sintering all three layers simultaneously.

Viewed from another aspect the invention provides a process for the preparation of a membrane electrode assembly comprising
(I) preparing, e.g. by extrusion, a green supporting electrode layer, said supporting electrode layer comprising a composite of a mixed metal oxide and Ni oxide;

(II) coating a green mixed metal oxide membrane layer onto said green supporting electrode layer;

(III) coating onto said green mixed metal oxide membrane layer, a green second electrode layer, said second electrode layer comprising a composite of a mixed metal oxide and Ni oxide; and (IV) sintering all three layers simultaneously.

Viewed from another aspect the invention provides a membrane electrode assembly produced by a process as herein defined.

Viewed from another aspect the invention provides a membrane electrode assembly comprising, in the following layer order:

(I) a supporting electrode material comprising a Ni composite of formula Ni—$AZr_aCe_bAcc_cO_{3-y}$, preferably where the ratio of Ni:$AZr_aCe_bAcc_cO_{3-y}$ is 0.2 to 0.8 on a volumetric basis (II) a membrane layer material comprising $AZr_aCe_bAcc_cO_{3-y}$;

(III) a second electrode material comprising a Ni composite of formula Ni—$AZr_aCe_bAcc_cO_{3-y}$, preferably where the ratio of Ni:$AZr_aCe_bAcc_cO_{3-y}$ is 0.2 to 0.8 on a volumetric basis wherein, for each layer independently, A is Ba, Sr or Ca or a mixture thereof;

the sum of a+b+c equals 1:

b is 0-0.45;

c is 0.1-0.5;

Acc is Y, Yb, Pr, Eu, Pr, Sc or In, or or a mixture thereof; and y is a number such that formula (I) is uncharged, e.g. y is $2.75 \leq y \leq 2.95$.

Viewed from another aspect the invention provides a membrane electrode assembly comprising, in the following layer order:

(I) a supporting electrode material comprising a Ni composite of formula Ni—$BaCe_{0.2}Zr_{0.7}Y_{0.1}O_{3-y}$, preferably where the ratio of Ni:$BaCe_{0.2}Zr_{0.7}Y_{0.1}O_{3-y}$ is 0.2 to 0.8 on a volumetric basis;

(II) a membrane layer material comprising $BaCe_{0.2}Zr_{0.7}Y_{0.1}O_{3-y}$;

(III) a second electrode material comprising a Ni composite of formula Ni—$BaCe_{0.2}Zr_{0.7}Y_{0.1}O_{3-y}$, preferably where the ratio of Ni:$BaCe_{0.2}Zr_{0.7}Y_{0.1}O_{3-y}$ is 0.2 to 0.8 on a volumetric basis.

Viewed from another aspect the invention provides use of a membrane assembly as hereinbefore defined as a proton conducting membrane, in particular under conditions wherein before electrode layers are exposed to reducing conditions. The mixed metal oxide of the MEA is ideally a ceramic.

Definitions

A membrane electrode assembly (MEA) as defined herein comprises an anode/electrolyte/cathode configuration in which one electrode layer acts as a structural element to support mechanical loads. The electrode layers are porous and the electrolyte layer is dense (non porous).

The term "green" is used herein to define an electrolyte or electrode layer that has not been sintered to densify the layer. A green body is an object whose main constituent is weakly bound ceramic material before it has been sintered or fired. In ceramic engineering, the most common method for producing ceramic components is to form a green body comprising a powder of the desired composition of ceramic and binder, and then to sinter it in a furnace to produce a strong, dense object.

The term electrode support layer means that the electrode layer is the load bearing layer within the MEA. This layer may be considerably thicker than other layers in the MEA in order to support the assembly.

DETAILED DESCRIPTION OF INVENTION

The invention relates to a process for manufacturing a green precursor to a ceramic membrane electrode assembly and co-sintering all the green layers of the assembly to form an MEA that can act as a solid state electrochemical cell. Because we sinter all the layers of the assembly simultaneously, the present invention allows for a reduction in the time required for thermal processing, and reduces energy usage thereby reducing costs associated with the manufacturing thereof.

Specifically, the present invention relates to the application of a 'green' electrode slurry to the surface of a green electrode-supported 'green' electrolyte and the subsequent co-sintering of the entire MEA. FIGS. 7 and 8 present a flow chart of the current process and the effect of the present invention to reduce the number of steps required to produce a complete MEA.

Conventionally therefore, an electrode support is formed from a powder mixture and sintered. That support is coated with an electrolyte. That two layer assembly is sintered before a further electrode layer is added and a further sintering step is effected.

In the claimed process, we propose to coat a green electrolyte onto a green electrode support and a subsequent step of coating with a green second electrode layer before sintering in order to allow the use of a single sintering step. There should be no sintering of the support electrode or electrolyte before the second electrode layer is added. Remarkably, this process results in a useful MEA. All the layers adhere to each other despite the use of a single sinter step.

Traditionally, a MEA is operated with one reducing and one oxidizing side with respect to atmospheres. These dissimilar conditions require a second electrode different to the first electrode and often require a significantly dissimilar sintering temperature for each electrode. Additionally, a second electrode is often a single-phase material that may react with the membrane at the membrane sintering temperature to form a reaction product that degrades the device performance.

In a further embodiment, the MEA of the invention is operated with both sides of the MEA having reducing conditions. Examples of systems operating under such conditions are dehydrogenation reactions of hydrocarbons, hydrogen pumping, steam reforming reaction with hydrogen extraction. In other words, systems where both sides of the MEA operate under conditions where the both electrodes are chemically stable. This allows the use of the same electrode material for both first and second electrode, which allows sintering the full MEA in one single step.

First Electrode

The first step of the process of the invention involves the preparation of a green electrode support layer. This is also called the first electrode layer. The first electrode layer tends to be thicker than the electrolyte or second electrode layer as it supports the MEA. It is therefore preferred if the MEA does not contain a separate support layer. The MEA should be supported by the first electrode layer.

The first electrode layer may have a thickness of 250 microns to 2.0 mm, such as 500 microns to 1.5 mm, preferably 500 microns to 1.2 mm.

The first electrode layer is produced in the green state, i.e. it is not sintered/densified before the application of the electrolyte layer thereto.

The MEA may be in cylindrical form or planar form (or any other layered structure as required). The MEA has a layer structure as defined in claim 1 but the design of the MEA is otherwise flexible. Ideally however, the MEA is planar or cylindrical, especially cylindrical. Either anode or cathode can be present at the centre of the cylinder and the first electrode layer can be either anode or cathode.

The method for the preparation of the first electrode layer is quite flexible. In order to prepare the first electrode layer, a mould or support may be used. Thus, the first electrode layer may be deposited on a cylindrical or planar supporting mould. After the layer is formed, the mould can be removed leaving the first electrode layer. Alternatively, the first electrode layer could be extruded to form a cylinder or planar support.

The first electrode layer may be prepared by methods including extrusion, slip casting, injection molding, tape casting, wet and dry bag isopressing, and additive manufacturing.

The length/width of the first electrode layer is not critical but may be 10 to 50 cm. In tubular form, the inner tube diameter may be 2.0 mm to 20 mm, such as 2.0 to 15.0 mm. By inner tube diameter means the diameter is measured from the inside of the layer and excludes the thickness of the actual tube.

The mixture used to manufacture the supporting electrode material comprises ceramic powders and optional additives such as emulsifiers, pore formers, binders, rheology modifiers etc. in order to allow the formation process. The first electrode is preferably produced from a slurry comprising ceramic components, binders and rheology modifiers.

After sintering, the first electrode will comprise a mixed metal oxide so the mixture used to prepare it should comprise precursors to the desired mixed metal oxide. A preferred mixed metal oxide is based on the combination of an alkaline earth metal such as Ba or Sr with Zr and a lanthanide such as Y. The use of Ba, Zr and Y is preferred (forming therefore a BZY type mixed metal oxide). In a preferred embodiment therefore, the support electrode, after sintering, is a BZY type material. The mixed metal oxide may also preferably contain Ce ions.

Ideally, the first electrode comprises ions of
A, Zr, Acc and O, more preferably ions of
A, Zr, Ce, Acc and O;
wherein A is Ba, Sr or Ca or a mixture thereof; and Acc is a trivalent transition metal or trivalent lanthanide metal such as Y, Yb, Pr, Eu, Pr, In, or Sc or a mixture thereof.

More specifically, a preferred final (i.e. sintered) first electrode layer comprises a mixed metal oxide of formula (I)

$$AZr_aCe_bAcc_cO_{3-y} \quad (I)$$

wherein A is Ba, Sr or Ca or a mixture thereof;
the sum of a+b+c equals 1:
b is 0-0.45;
c is 0.1-0.5;
Acc is a trivalent transition metal or lanthanide metal such as Y, Yb, Pr, Eu, Pr, Sc, or In or a mixture thereof; and
y is a number such that formula (I) is uncharged, e.g. y is 2.75≤y≤2.95.

In particular, it is preferred if A is Ba. It is preferred if Acc is Y or Yb or a mixture thereof, especially Y.

In a further preferred embodiment therefore the first electrode comprises a mixed metal oxide of formula (II') or (II")

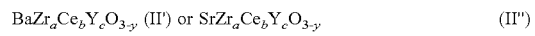

$$BaZr_aCe_bY_cO_{3-y} \text{ (II') or } SrZr_aCe_bY_cO_{3-y} \quad (II'')$$

wherein the sum of a+b+c equals 1:
b is 0-0.45;
c is 0.1-0.5; and
y is a number such that formula (I) is uncharged, e.g. y is 2.75≤y≤2.95.

Where b is 0 there are no Ce ions and the formula reduces to:

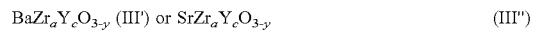

$$BaZr_aY_cO_{3-y} \text{ (III') or } SrZr_aY_cO_{3-y} \quad (III'')$$

wherein the sum of a+b+c equals 1:
c is 0.1-0.5; and
y is a number such that formula (I) is uncharged, e.g. y is 2.75≤y≤2.95.

A preferred ceramic comprises ions of Ba, Ce, Zr, Y and O. A highly preferred ceramic mixed metal oxide is of formula $BaCe_{0.2}Zr_{0.7}Y_{0.1}O_{3-y}$.

It is preferred if b+c sums to 0.1 to 0.5, such as 0.2 to 0.4.
It is preferred if b is 0.1 to 0.4, such as 0.15 to 0.3, e.g. 0.2.
It is preferred if c is 0.05 to 0.2.
It is preferred if the ceramic material of the first electrode adopts a perovskite crystal structure.

The first electrode material is a composite material in which the ceramic mixed metal oxide, ideally the BZY mixed metal oxide described above, is combined with NiO. This composite is sintered, e.g. at a temperature above 400° C. and ideally reduced in a reducing gas (to reduce NiO to Ni), e.g. at a temperature between 500 and 1000° C. In a preferred embodiment therefore, the first electrode material, is a mixture of BZY metal oxide with a nickel oxide. On sintering, the blend produces a composite of nickel oxide with the BZY. After sintering, the composite is exposed to a reducing gas, which reduces the nickel oxide to nickel leaving a porous structure.

The compounds required to make the target mixed metal oxide of the first electrode can therefore be combined with a nickel compound to form a composite structure. The Ni is preferably added in the form of its oxide.

The ratio of Ni compound:mixed metal oxide in the composite after sintering may be 0.2 to 0.8 on a volumetric basis. Ideally, the nickel compound(s) forms at least 50 wt % of the green electrode layer. Ideally, the Ni component forms at least 50 wt % of the sintered electrode. Ideally, the Ni component forms at least 50 wt % of the sintered and reduced electrode.

The metal ions required to form the ceramic mixed metal oxide that forms the electrode layer can be supplied as any convenient salt of the ion in question. During the sintering process, the salts are converted to the oxide so any salt can be used. The amount of each component is carefully controlled depending on the target end mixed metal oxide. The Ni oxide acts as a sintering aid. The amount of Ni material added can also be readily calculated by the skilled person.

Suitable salts include sulphates, nitrates, carbonates and oxides of the ions. The use of sulphates is preferred for the alkaline earth metal component, especially $BaSO_4$. The use of $CeO_2$ is preferred for the cerium ion source. The use of $ZrO_2$ is preferred as the Zr source. The use of oxides is preferred for the Acc ion source. $Y_2O_3$ is preferred as the Y ion source.

Particles of the reactant precursor materials can be milled to form a powder mixture. Once formed, this powder mixture can be combined with nickel oxide to form a powder mix.

It is preferred if the reactants and the Ni oxide needed to make the first electrode layer are prepared as a slurry in an aqueous or non aqueous solvent (such as an alcohol). The use of water is preferred. The relative amounts of the reactants can be carefully measured to ensure the desired mixed metal oxide stoichiometry and the desired Ni content in the final product after sintering. Essentially all the metal oxide/NiO present becomes part of the sintered electrode body and all other components are removed thus the amounts of each component required to develop the desired stoichiometry can be readily calculated by the skilled person.

As well as the metal salts required to make the mixed metal oxide and the nickel oxide composite, the slurry used to make the first electrode layer may comprise other components present to ensure the formation of an electrode layer. Such components are well known in the art and include binders, rheology modifiers, dispersants and/or emulsifiers or other additives to ensure that the electrode support forms and remains solid and intact until the sintering process. Additives therefore act as a kind of adhesive sticking the metal salt particles together to form a layer.

Suitable additive compounds include ammonium polyacrylate dispersant and acrylic emulsions. The content of additive such as emulsifier/dispersant may be between 0 to 10 wt %, such as 1 to 5 wt % of the mixture as a whole. Suitable binders would be methyl cellulose, acrylic emulsions, and starches. The content of such binders may be between 0 to 10 wt % such as 1 to 5 wt % of the mixture as a whole.

Water is the preferred solvent and may form 5 to 20 wt % of the slurry used to form the supporting electrode layer. The metal components required to form the composite may form 50 to 80 wt % of the slurry.

This slurry can be extruded, applied to a mould, etc as discussed above to form the first electrode and subsequently dried to leave a solid but unsintered green body as a precursor to the composite first electrode layer. It will be appreciated that any additives present are preferably organic as these will decompose during the sintering process. It will be appreciated that the green layers described herein are precursors of the actual electrode. The electrode is formed upon sintering.

Electrolyte Layer (Also Called Membrane Layer)

Once the green electrode support layer has been prepared, the green electrolyte layer can be applied. The electrolyte layer is also known as the membrane layer. The electrolyte layer is applied as a 'green' ceramic slurry which may comprise membrane materials, binders, emulsifiers and rheology modifiers etc. It is preferred if the membrane mixed metal oxide is similar to that of the electrode layer however no Ni oxide material is present in the membrane layer. The membrane layer is therefore non porous after densification.

After sintering, it is preferred if the electrolyte layer comprises at least one mixed metal oxide comprising the following ions:

A, Zr, Acc and O, more preferably ions of
A, Zr, Ce, Acc and O;
wherein A is Ba, Sr or Ca or a mixture thereof; and Acc is a trivalent transition metal or trivalent lanthanide metal such as Y, Yb, Pr, Eu, Pr, In, or Sc or a mixture of these ions.

More specifically, a preferred final (i.e. sintered) first electrode layer comprises a mixed metal oxide of formula (I)

$$AZr_aCe_bAcc_cO_{3-y} \quad (I)$$

wherein A is Ba, Sr or Ca or a mixture thereof;
the sum of a+b+c equals 1:
b is 0-0.45;
c is 0.1-0.5;
Acc is a trivalent transition metal or lanthanide metal such as Y, Yb, Pr, Eu, Pr, Sc or In or a mixture thereof; and
y is a number such that formula (I) is uncharged, e.g. y is 2.75≤y≤2.95.

In particular, A is Ba. It is preferred if Acc is Y.

In a further preferred embodiment therefore the first electrode comprises a mixed metal oxide of formula (II)

$$BaZr_aCe_bY_cO_{3-y} \text{ (II') or } SrZr_aCe_bY_cO_{3-y} \quad (II'')$$

wherein the sum of a+b+c equals 1:
b is 0-0.45;
c is 0.1-0.5; and
y is a number such that formula (I) is uncharged, e.g. y is 2.75≤y≤2.95.

Where b is 0 there are no Ce ions and the formula reduces to:

$$BaZr_aY_cO_{3-y} \text{ (III') or } SrZr_aY_cO_{3-y} \quad (III'')$$

wherein the sum of a+b+c equals 1:
c is 0.1-0.5; and
y is a number such that formula (I) is uncharged, e.g. y is 2.75≤y≤2.95.

A preferred ceramic comprises ions of Ba, Ce, Zr, Y and O. A highly preferred ceramic mixed metal oxide is of formula $BaCe_{0.2}Zr_{0.7}Y_{0.1}O_{3-y}$.

It is preferred if b+c sums to 0.1 to 0.5, such as 0.2 to 0.4.

It is preferred if b is 0.1 to 0.4, such as 0.15 to 0.3, e.g. 0.2.

It is preferred if c is 0.05 to 0.2.

It is preferred if the ceramic material of the first electrode adopts a perovskite crystal structure.

The mixed metal oxide of the electrolyte layer may be the same or different from the mixed metal oxide used in the first electrode layer. In one embodiment, the two mixed metal oxides are alkaline earth based zirconates of pervoskite structure, such as Ba and Sr zirconates. It is more preferred if both are based on barium zirconate although the doping elements present may differ. In a further embodiment the mixed metal oxide used in the support electrode and the membrane are the same.

It is important however that the membrane layer is free of the Ni oxide material. The Ni oxide material, upon reduction, creates a porous composite layer that is essential in the electrode layer but not useful in the electrolyte layer. The electrolyte layer is dense rather than porous. By porous is meant that the reactants and products of the dehydrogenation can pass through the porous layer to contact the dense membrane layer. The membrane layer is not porous to any of the reactants or products other than hydrogen.

The metal ions required to form the ceramic mixed metal oxide that forms the electrolyte layer can be supplied as any convenient salt of the ion in question. Preferred salts are discussed above in the context of the first electrode layer. During the sintering process the salts are converted to the desired mixed metal oxide.

Suitable salts include sulphates, nitrates, carbonates and oxides of the ions. The use of $BaSO_4$ is preferred. The use of $CeO_2$ is preferred. The use of $ZrO_2$ is preferred. The use of $Y_2O_3$ is preferred.

It is preferred if the reactants needed to make the electrolyte layer are prepared as a slurry in an aqueous or non aqueous solvent. The relative amounts of the reactants can be carefully measured to ensure the desired mixed metal oxide stoichiometry in the final product after sintering. The use of an organic solvent is preferred.

For the membrane slurry, the weight fraction of powders to spray vehicle is between 40 and 75% by weight, preferably from 45 to 55%. The solvent for the membrane slurry is preferably non-aqueous so as to promote the use of binders that are not water soluble. The solvent ideally consists of a mixture of organics with high and low vapor pressures.

The high vapor pressure component promotes drying to reduce the incidence of runs and drips while the lower vapor pressure component is used to avoid mud cracks. The high vapor pressure solvents can be low molecular weight acetates, such as ethyl, butyl or amyl acetate, alcohols such as methanol, ethanol, n-propanol, with amyl acetate being found to be preferable.

The viscosity of the slurry is controlled to aid in deposition. For spray coating, the slurries should have a viscosity of 10 to 30 cP as measured using a LV2 spindle at 60 rpm on a Brookfield viscometer.

Any method can be used to apply the electrolyte layer to the first electrode layer such as spray coating, dip coating, hand wash, pulsed laser deposition, physical vapor deposition, screen printing.

It will be appreciated that the first electrode layer and the membrane layer should be adjacent without any intermediate layer. Once applied to the electrode layer, the two green layer structure can be dried.

The electrolyte layer may have a thickness of 10 to 200 microns, such as 20 to 40 microns. The dimensions of the electrolyte layer can be controlled by the person skilled in the art.

Second Electrode

The second electrode typically has a similar structure to that of the first electrode, such as the same as the first electrode. It is possible therefore for the mixed metal oxide in all three layers to be the same. It is ideally therefore a composite of a mixed metal oxide and Ni oxide. Any method can be used to apply the second electrode layer to the electrolyte layer. It will be appreciated that these two layers should be adjacent without any intermediate layer. Methods include dip coating, spray coating, hand wash, pulsed laser deposition, physical vapor deposition, and screen printing.

The second electrode layer may have a thickness of 20 to 400 microns, such as 30 to 100 microns It will be appreciated that the second electrode layer need not cover the whole of the electrolyte layer. The dimensions of the second electrode layer can be controlled by the person skilled in the art.

The second electrode layer is preferably provided as a green ceramic slurry. For the second electrode slurry, the weight fraction of metallic powders to coating vehicle is preferably between 30 and 85% by weight, preferably from 40 to 60%. The solvent for the second electrode slurry may be organic or aqueous but is preferably aqueous so as to minimize re-dissolution of the electrolyte layer and/or swelling of the electrolyte layer both of which would lead to catastrophic failure of the membrane prior to further processing.

Again, the ceramic compounds used to form the second electrode layer are ideally mixed with additives including emulsifiers, rheology modifiers, binders and so on to ensure a good layer application to the electrolyte layer. The viscosity of the slurry is controlled to aid deposition. The viscosity required is a function of the nature of the application technique. For spray coating, slurries may have a viscosity of 10 to 30 cP as measured using a LV2 spindle at 60 rpm on a Brookfield viscometer. Being an aqueous system, the viscosity can be easily adjusted by the use of polyionic dispersing agents. Such dispersants can be polyacrylate and polymethacrylate salts and lignosulfonates, with ammonium polyacrylate (e.g., Duramax D-3005 or Darvan 821A) being preferable.

A dip coating slurry can be prepared containing approximately a) 50 wt % of a mixture comprising 75 to 95 wt % electrode powders, 2 to 3% methylcellulose binder, up to 2% starch, up to 2% plasticizer, up to 2% dispersant; and b) 50 wt % water.

It is preferred if the second electrode, after sintering, is a composite of formula $NiO\text{---}AZr_aCe_bAcc_cO_{3-y}$ where the ratio of $NiO:AZr_aCe_bAcc_cO_{3-y}$ is 0.2 to 0.8 on a volumetric basis and the variables are as herein before defined for first electrode layer.

Alternatively viewed, it is preferred if the second electrode, after sintering, is a composite of formula $NiO\text{---}AZr_aCe_bAcc_cO_{3-y}$ where the weight ratio of $NiO:AZr_aCe_bAcc_cO_{3-y}$ is 0.2 to 0.8 and the variables are as herein before defined for first electrode layer.

It is preferred if the second electrode, after sintering and reduction, is a composite of formula $Ni\text{---}AZr_aCe_bAcc_cO_{3-y}$ where the ratio of $Ni:AZr_aCe_bAcc_cO_{3-y}$ is 0.2 to 0.8 on a volumetric basis and the variables are as herein before defined for first electrode layer.

Alternatively viewed, it is preferred if the second electrode, after sintering and reduction, is a composite of formula $Ni\text{---}AZr_aCe_bAcc_cO_{3-y}$ where the weight ratio of $Ni:AZr_aCe_bAcc_cO_{3-y}$ is 0.2 to 0.8 and the variables are as herein before defined for first electrode layer.

In one embodiment the solvent used to deposit the outer electrode is different from the solvent used to deposit the membrane layer. In one embodiment the solvent used to deposit the membrane layer is different from the solvent used to deposit the supporting electrode layer. The binders used in the electrode and membrane layers are then designed to reflect the solvent used. This is important as we don't want a subsequent layer deposition step to dissolve any of the binder used in the previous formation step.

For example, if the binder used in the membrane coating is soluble in water, the layer will dissolve in water if we dip coat the outer electrode using an aqueous solvent.

Even when dissolution is not an issue, the membrane layer can absorb a solvent and swell. So, even if the green membrane layer does not dissolve, it could swell, causing cracking and delamination.

In a preferred embodiment, water is employed as the solvent for outer electrode deposition and an ester as the solvent for the spray coating of the membrane. Additives can be added to the slurries used in the coating process to ensure adjust the solubility of the membrane layer/electrode layer in organic/aqueous solvents.

Sintering

Once the three layers are formed, the whole assembly can be sintered. It is crucial therefore that all layers are sintered simultaneously. In the sintering process, the whole assembly is subject to thermal heat treatment to firstly remove organic components and any water and secondly to densify the assembly. It may be that the heat treatment process is effected in stages.

A lower initial heat treatment step can be used to remove organics that are present. That step can be followed by a higher temperature sintering step to complete the densification process.

The initial heat treatment may be effected at a temperature of 200 to 500° C., such as 250 to 400° C. The process will start at ambient temperature and the rate of temperature increase may be 1 to 5° C. per minute. A dwell may occur at a temperature in the above range for a period of time.

The sintering temperature to ensure densification of the MEA may be effected at a temperature of at least 1000° C., such as 1100 to 2000° C., e.g. 1200 to 1800° C. Ideally, temperatures up to 1600° C., e.g. 800 to 1500° C., preferably 1000 to 1450° C., e.g. 1200° C. to 1400° C. are used. Again, the rate of temperature increase may be 1 to 5° C. per minute.

Sintering can be done in several different atmospheres, e.g. oxygen, hydrogen, inert gases, hydrogen, steam or mixtures such as air or humidified oxygen. Ideally an atmosphere such as air is used.

If NiO is present during the sintering process and sintering is done under an atmosphere where the NiO is retained in the material, a second reducing step is needed. It is advised that this step is done under reducing conditions such as hydrogen or diluted hydrogen. It is further advised that this is done at a temperature a temperature between 500 and 1200° C., more preferred between 700 and 1100° C., most preferred between 800 and 1000° C.

After sintering, it is preferred if each layer of the MEA is essentially free of any organic material. Electrode layers ideally comprise, such as consist of, the composite of Ni-BZY and the membrane layer comprises, such as consists of, a dense mixed metal BZY material.

The electrode layers are ideally porous, letting compounds such as hydrogen penetrate without hindrance. The electrolyte layer is ideally dense.

Properties of the MEA

After sintering it is preferred if each layer of the MEA is essentially free of any organic material. Electrode layers ideally consist of the composite of Ni-BZY and the membrane layer consists of a mixed metal BZY material.

The electrode layers are ideally porous, letting compounds such as hydrogen penetrate without hindrance. The electrolyte layer is ideally dense.

The sintered MEA of the invention can be used in a wide variety of applications. It is particularly, preferred if the MEA is used as a proton conducting membrane. The MEA can therefore be used within a proton conducting reactor.

The MEA is thus preferably used to dehydrogenate a reactant gas such as methane. Ideally, the MEA will possess a proton conductivity of at least $1 \times 10^{-3}$ S/cm. The proton conductivity of the membrane of the invention is preferably at least $1.5 \times 10^{-3}$ S/cm, especially at least $5 \times 10^{-3}$ S/cm. Further, ideally the membrane of the invention should an oxygen transport number of 0.001 to 0.5, such as 0.01 to 0.2, preferably between 0.05 and 0.1.

Reactor

The MEA can be used in a reactor where a gas to be dehydrogenated (or a gas containing hydrogen) is fed in the reactor. The reactor will contain an inlet for the feed gas and an outlet for a product material both in a first zone of the reactor. The MEA of the invention separates the first zone from a second zone. In operation hydrogen, in the form of protons, passes from the first zone, through the MEA to the second zone.

The temperature of the feed is such that the materials are fed as gases. Typically, the feed will be heated to have the same temperature as the reactor.

The process within the reactor is normally operated at high temperatures of 300° C. to 1000° C., preferably 400° C. to 800° C. The pressure within the reactor may range from 0.5 to 50 bar, preferably 5 bar to 25 bar.

There needs to be a flow from the feed inlet to the product outlet within the reactor. Feedstock gas flow, measured as GHSV (gas hourly space velocity) is normally in the range 500-30,000 mL/gh, more preferred in the range 1000-10,000 mL/gh.

Hydrogen is generated during the dehydrogenation reaction and the amount of hydrogen removed from the reactor via the membrane can be manipulated depending on how the user wants the process to be run.

The electrochemical driving force for the hydrogen transport across the membrane may be the result of an external voltage being applied to the membrane.

Thus, the membrane is provided with electrodes in order to allow an electric field to be applied over the membrane. This allows hydrogen to disassociate into electrons and protons whereupon protons selectively pass through the membrane to a said second zone where proton recombine with electrons that are provided through the external circuit resulting in formation of hydrogen on the second side of the membrane.

As hydrogen passes through the membrane, the pressure in the second zone increases. The hydrogen in the second zone can be reacted with an reactant containing gas so as to encourage a concentration gradient across the membrane, such as oxygen or CO.

The reactor may also provide with a pressure regulator at the gas outlet within the second zone. This pressure regulator enables control over the pressure with the second zone. Once the process is running, the pressure in the second zone may be higher than the pressure of hydrogen in the first zone.

The pressure regulator can be used to ensure a particular pressure is achieved within the second zone. Suitable pressures within the second zone are 2 to 700 bars, such as 10 to 350 bars, e.g. 20 to 100 bars.

Joule heating, also known as ohmic heating or resistive heating, is the process by which the passage of an electric current through a conductor releases heat. In the present invention, the ohmic loss during the operation of the membrane will cause Joule heating. The heat generated in this process can be used to provide the heat required for the reforming process.

A membrane electrode assembly of 18.9 cm$^2$ with a area specific resistance (ASR) of 0.8 Ω cm$^2$ operating at a current density of 328 mA/cm$^2$ will emit 2.7 W. A bundle of 215 tubes will generate 14 kWh during 24 h operation. This heat will balance the heat required to steam reform 6 Nm$^3$ of CH$_4$ at a conversion of 98%.

Thus the current applied across the membrane can be readily determined depending on the resistance of the membrane.

The membrane may have a resistance of 0.2 to 1.5 of 0.8 Ω cm$^2$ such as 0.5 to 1.2 of 0.8 Ω cm$^2$. The current density applied can be 200 to 600 mA/cm$^2$, such as 250 to 500 mA/cm$^2$.

The reactor utilized may include a dehydrogenation catalyst to encourage any dehydrogenation reaction. Any dehydrogenation catalyst capable of achieving the desired process can be used.

The dehydrogenation catalyst may be integrated in the reactor as a packed fixed bed, as a fluidized bed or by deposition on the MEA or in other way.

The dehydrogenation catalyst is preferably a porous catalyst but it should ideally have some electron and proton conductivity as these species may need to be transported through the catalyst on the membrane.

For methane dehydrogenation, the one suitable catalyst is a H-ZSM5 or MCM-22 zeolite with an active metal with reported activity in the order Mo>W>Ga>Fe>V>Cr to form aromatic products.

Some perovskite compounds may be suitable as catalysts such as those of formula $AB_{1-q}B'_qO_{3-z}$ where A=Ca, Sr or Ba; B=Ce, Tb, or Pr; B'=Ti, V, Cr, Mn, Fe, Co, Ni, or Cu or combinations thereof; and $0.02<q<0.5$.

Preferably, however the most suitable catalysts include metals of the first row of transition metals such as Ni, Fe, Pt, Ag, Pd and their alloys. These can be supported on alkali metal oxides with suitable examples $CrO_2$, $MoO_3$ and $V_2O_5$ or be a part of the electrode.

For ethane dehydrogenation any of the above mentioned catalysts for methane is applicable, but preferred catalysts include alumina supported $Ga_2O_3$, $CrO_2$, $MoO_3$ and $V_2O_5$ such as $CrO_2$, $MoO_3$ and $V_2O_5$.

The choice of metal depends on the design, the desired activity and the compatibility with the membrane reactor.

In one embodiment the catalyst will be deposited on the membrane. This will be achieved by techniques such as dip coating or impregnation, where the catalyst is dispersed in a solution. The membrane is then heat treated so that the catalyst is adhered to the membrane surface. The deposition can also be achieved by growing the catalyst directly on the membrane by a crystal growth technique.

A second embodiment includes a reactor where the catalyst is freely lying on top of, or in front of the membrane. The catalyst can be in the form of powder with tailored particle size. The catalyst is not adhered to the membrane. In this embodiment the catalyst can therefore easily be exchanged if it needs to be regenerated.

In some embodiments, no catalyst is used at all. In some embodiments, the material used in the MEA has sufficient catalytic activity that no further catalysts is needed.

In principle any reactor design can be used, however preferred reactor designs are flow-type fixed bed, fluidized bed and wash-coated designs. It is important therefore that there is flow from inlet to outlet in the first zone of the reactor. One advantageous design utilises a reactor within which there is a tubular transport membrane. Between the reactor walls and the tubular membrane is an optional bed of dehydrogenation catalyst. This forms the first zone in the reactor. This bed need not extend the whole length of the reactor but it may. Alternatively, the first zone of the reactor is inside the tube where the catalyst may also be located.

For a steam reforming reaction, water and alkane gases are fed into the first zone. Optionally the gases are fed into the inside of the tube, if that is preferred. Dehydrogenation occurs on contact between the reactants and the catalyst thus forming hydrogen. Hydrogen gas generated passes through the membrane and into the second zone of the membrane.

Current can also be applied as explained above to encourage transport of hydrogen across the membrane.

Gases which pass through the catalyst bed and which do not pass through the membrane can be collected at the outlet in the first zone.

It is preferred that the distance from the catalyst to the membrane is as short as possible, preferable no more than 5 cm and more preferable less than 5 mm.

It is most preferred that the catalyst is a part of the electrode or the electrode material of electrode in first zone.

It is preferred if hydrogen is removed in a counterflow direction to the flow of the reactant gases.

Reactant

The MEA of the invention might be used in the dehydrogenation of any useful substance. It is preferred if the compound for dehydrogenation is a hydrocarbon, especially methane (e.g. natural gas). It is also preferred that steam is introduced with the hydrocarbon to allow for a reforming reaction.

The conversion of substance achieved in this invention is preferably at least 95 wt %, preferably at least 97 wt %, e.g. 99 wt % or more. This means that almost all the substance (typically an alkane) fed to the reactor is converted to the dehydrogenated desired product.

Moreover, it is preferred if the selectivity is preferably at least 95 wt %, preferably at least 97 wt %, e.g. close to 100 wt %. This means that the formed dehydrogenated product is at least 95 wt % pure, i.e. there are almost no impurities present at all.

The invention will now be defined with reference to the following non limiting examples and figures.

A electrode support structure is illustrated in FIG. 3. The first layer comprises the electrode support. The second layer comprises the membrane. The third layer comprises the second electrode. In a further embodiment, a catalyst layer can be adhered to the surface of the MEA or lie freely on top (not shown).

A tubular membrane-support structure/design is illustrated in FIG. 4. Two general designs are possible. One with a catalyst layer on the surface of electrode layer 3 and one with the catalyst layer on the inside of the tube. An arrangement with the catalyst layer on the surface of the tube is advantageous if the dehydrogenation reaction is slow. If the reduction reaction of $O_2$ and/or the water formation reaction and/or the diffusion of water/$O_2$ to the membrane are the slowest the arrangement with the catalyst layer inside the tube will be advantageous. FIG. 4 shows the support layer (1) with membrane layer (2) and outer electrode layer 3.

An embodiment for a planar reactor design is illustrated in FIG. 5. Modules of catalyst-membrane-support assemblies are stacked horizontally arranged so that the support faces a support of a second assembly, and the catalyst faces a catalyst of a third assembly and so on. This stacking form channels for the reactant gas and the purge gas respectively. Each assembly is sealed at the end with suitable sealing material, such as a glass which is non-catalytically active towards coke formation.

The embodiment shown has a counter-current gas flow. This configuration has a similar hydrogen pressure gradient $\Delta P$ in the two end segments. The first segment is located at the inlet of the reactant gas. The hydrogen concentration will be highest at this point, while the oxygen content in the purge gas will be the lowest. In the other end, of the air inlet, the hydrogen pressure will be at the lowest point, while the oxygen pressure will be at the highest. The pressure gradient in the two ends will be approximately equal, which is also true for the part between the two ends. This will ensure a homogeneous dehydrogenation along the membrane, which furthermore will stabilize the conversion towards carbon formation. In this way a constant thickness of the membrane can be used throughout the reactor.

Figure 6:
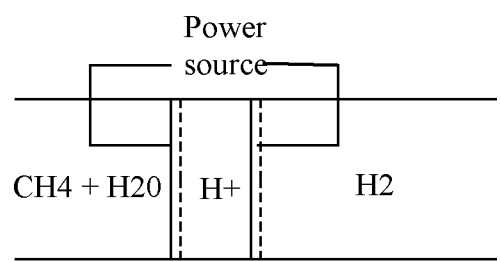

FIG. 6 shows the membrane reactor in action. The membrane separates a first zone from a second zone. The first zone contains methane and steam. Upon dehydrogenation of the methane, hydrogen in the form of protons passes through the membrane to the second zone. Current is applied across the membrane to encourage transport.

Figure 7:
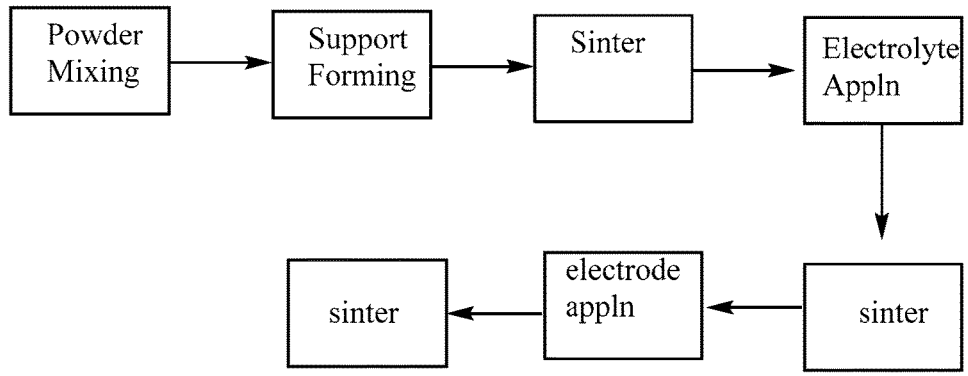

FIG. 7 presents a flow chart of the current MEA production process.

Figure 8:
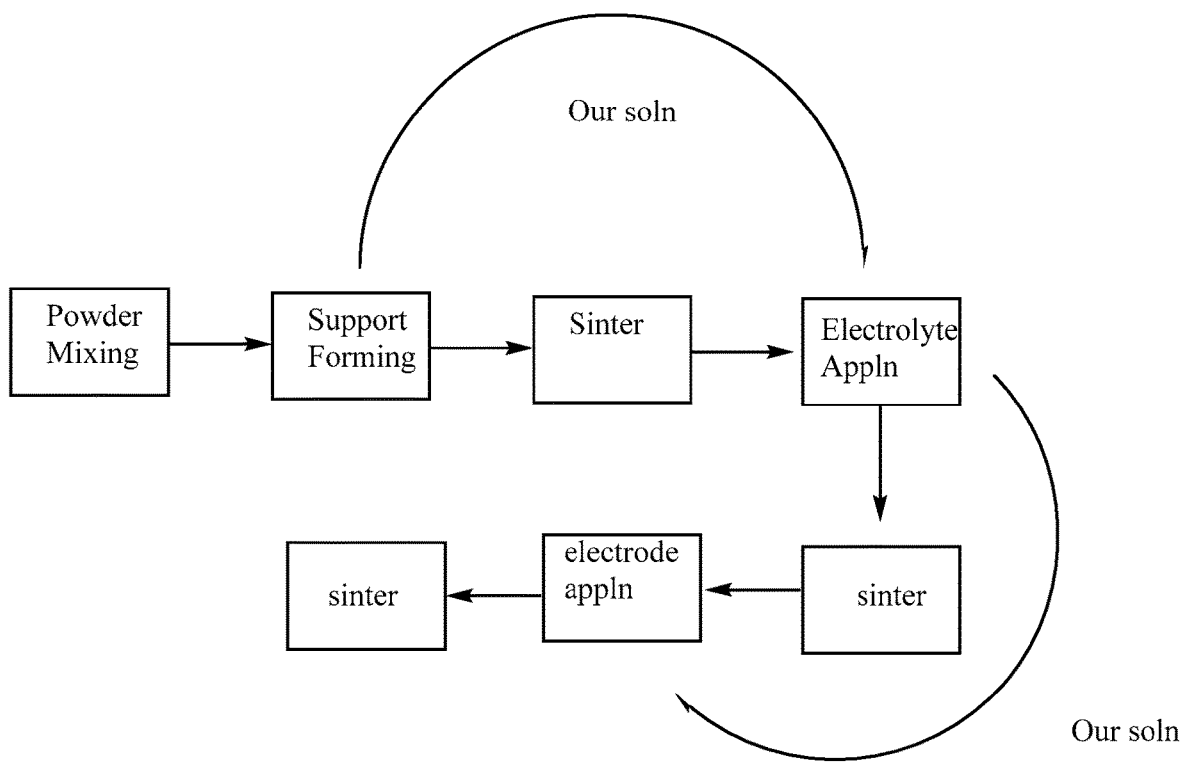

FIG. 8 shows the effect of the present invention to reduce the number of steps required to produce a complete MEA.

Example 1

This example used a water-based system for the slip casting of a closed-one-end tube as the supporting electrode. A 'green' ceramic tube was produced by casting a ceramic-laden slip into a plaster mold. The ceramic material contained 60% NiO by weight and 40% by weight of a mixture of $BaSO_4$, $CeO_2$, $ZrO_2$, and $Y_2O_3$ in molar ratios to yield $BaCe_{0.2}Zr_{0.7}Y_{0.1}O_{3-y}$ on decomposition and reaction.

The reactants, including NiO, are mixed as powders to form a powder mix. The powder mix was milled for 24 hours to improve homogeneity. A slurry was then made from the milled powder by adding, relative to the weight of the powder, 30 to 60 wt % water, 0 to 1% ammonium polyacrylate dispersant, and 1 to 5% acrylic emulsion as a binder. The resulting slurry was cast into the plaster mould and dried. A tube was produced of 13.5 mm diameter and 0.75 mm wall thickness. This tube is called the green substrate and acts as the first electrode after densification.

After removal of the green substrate from the plaster mold, a coating of ceramic laden slurry was applied to the outside of the tube by means of a spray coating process. This slurry consists of 40 to 60 wt % materials to form the electrolyte in an organic spray vehicle. The ceramic precursors were a mixture of $BaSO_4$, $CeO_2$, $ZrO_2$, and $Y_2O_3$ as a heterogeneous dispersion in molar ratios to yield $BaCe_{0.2}Zr_{0.7}Y_{0.1}O_{3-y}$ on decomposition and reaction. The spray vehicle comprises a methyl methacrylate resin dissolved in a mixture of organic solvents and a dispersant. The resulting tube, consisting of a green thick-walled tube of electrode material with a coating of green membrane material, was allowed to dry overnight. The membrane layer had an approximate thickness of 25 to 30 μm.

The tube with was dip coated by submerging into a container bearing a coating slurry. A mixture comprising 94 wt % electrode powders, 2 to 3% methylcellulose binder, up to 2% starch, up to 2% plasticizer, up to 2% dispersant was prepared. This was then diluted with approx. 50 wt % water. The electrode powder mixture was the same as that used in example 1, i.e. the ceramic material contained 60% NiO by weight and 40% by weight of a mixture of $BaSO_4$, $CeO_2$, $ZrO_2$, and $Y_2O_3$ in molar ratios to yield $BaCe_{0.2}Zr_{0.7}Y_{0.1}O_{3-y}$ on decomposition and reaction.

The tube was then retracted from the dip coat slurry to produce a layer of green second electrode material. The thickness of the green second electrode material was controlled by the solid fraction of the slurry, the time the tube remains in the slurry, and the rate at which the tube was extracted from the slurry. The tube was then allowed to dry.

The length of the second electrode was controlled by a combination of masking and/or adjusting the depth of submersion of the tube in the dip coating procedure.

The resulting 'green' tube comprised a green electrode support with green electrolyte coating and outer green electrode coating. This tube was then sintered to produce a concentric MEA in an electrode-supported configuration consisting of an electrode support of 750 μm nominal thickness, ionic membrane of 25 μm nominal thickness, and second electrode of 35 μm. The sintering process used a tube hang fired in a muffle furnace using tubular kiln furniture as a support. The furnace temperature was raised slowly (c. 1°/min) to 250-350° C. for debinding and sintered at high temperature (at least 1550° C.) to produce a dense membrane electrode assembly.

Example 2

This example used a water-based system for the extrusion of the supporting electrode. First, a mixture of the supporting electrode powders was homogenized in a high shear mixer. The materials contained 60% NiO by weight and 40 wt % by weight of a mixture of $BaSO_4$, $CeO_2$, $ZrO_2$, and $Y_2O_3$ in molar ratios to yield $BaCe_{0.2}Zr_{0.7}Y_{0.1}O_{3-y}$ on decomposition and reaction. To this was added an aqueous binder system such that a paste was made containing 75 to 85 wt % electrode powders/support oxide, 2 to 3 wt % methylcellulose binder, up to 2% starch, up to 2% plasticizer, up to 2% dispersant and 9 to 12% water.

The paste was then extruded through an annulus using a 45 tonne hydraulic ram extruder to produce a green tube of 13.5 mm outer diameter and 0.8 mm wall thickness. The tubes were cut to an arbitrary length, typically 35 to 40 cm.

These tubes were then coated using a computer controlled ultrasonic spray coater with a slurry consisting of 40 to 60 wt % ceramic materials to form the electrolyte in an organic spray vehicle. The ceramic precursors were a mixture of $BaSO_4$, $CeO_2$, $ZrO_2$, and $Y_2O_3$ in as a heterogeneous dispersion in molar ratios to yield $BaCe_{0.2}Zr_{0.7}Y_{0.1}O_{3-y}$ on decomposition and reaction.

The spray vehicle contained a methyl methacrylate resin dissolved a mixture of organic solvents and a dispersant. The resulting tube, consisting of a thick-walled tube of electrode material with a coating of membrane material, was allowed to dry overnight.

A dip coating slurry was made containing a mixture of a). 50 wt % of a blend of 75 to 95 wt % electrode powders, 2 to 3 wt % methylcellulose binder, up to 2% starch, up to 2% plasticizer, up to 2% dispersant and b). 50 wt % water. The tube was then submerged into a container bearing the dip coating slurry. The tube was then retracted from the dip coat slurry to produce a layer of green material, the thickness being controlled by the solid fraction of the slurry and the extraction rate. The tube was then allowed to dry.

Figure 1:
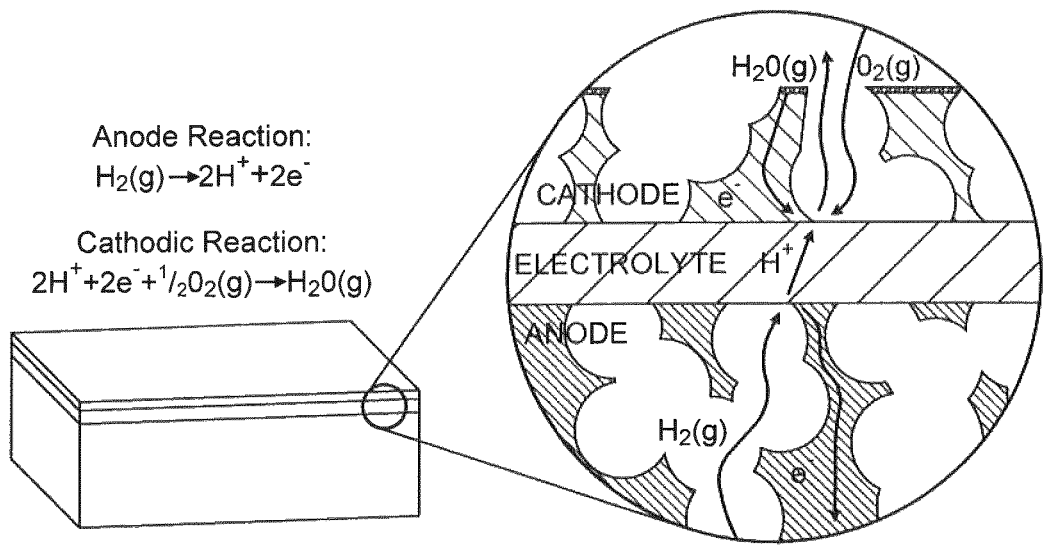
FIG. 1 is a general schematic of a membrane electrode assembly (MEA) showing an anode at which reactions occur that generate electrons, a cathode at which reactions occur that consume electrons, and an electrolyte which conducts ions but is insulating towards electrons. In this case, the overall reaction is the oxidation of hydrogen to generate water.
Figure 2:
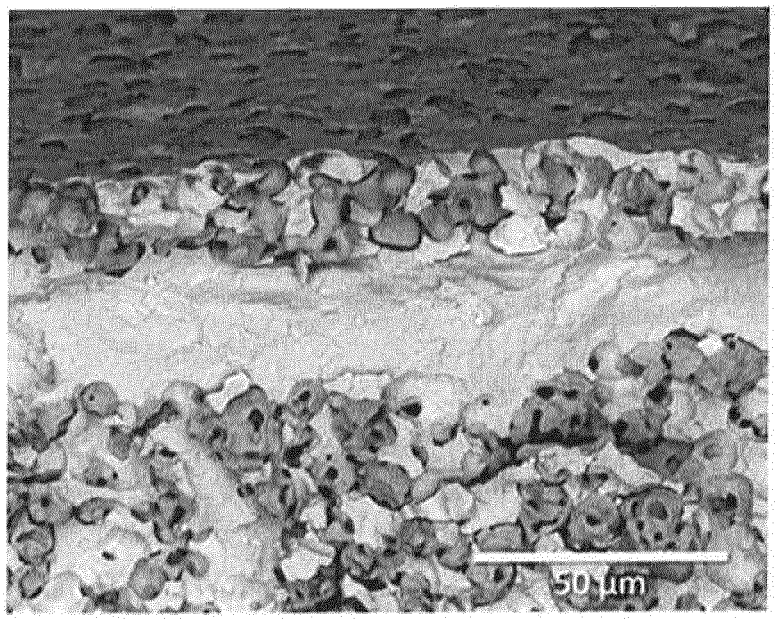
FIG. 2 is a micrograph of a fracture surface showing the structure resulting from the use of a single co-sintering step to produce the MEA architecture. Note that the electronically active component of the electrodes (dark grey phase) has undergone a further reduction step.

The tube was then hang fired in a muffle furnace using tubular kiln furniture as a support. The furnace temperature was raised slowly (c. 1°/min) to 250-350° C. for debinding and sintered at high temperature to produce a dense membrane electrode assembly. An example of the microstructure that results (after reduction of the electronically active component of the electrodes) is given in FIG. 2.

The invention claimed is:

1. A process for the preparation of a membrane electrode assembly, the process comprising:
   providing, in the following layer order,
   a green supporting electrode layer comprising precursors to a first composite of a mixed metal oxide and Ni oxide;
   a green membrane layer comprising precursors to a mixed metal oxide; and a green second electrode layer comprising precursors to a second composite of a mixed metal oxide and Ni oxide; and sintering the green supporting electrode layer, the green membrane layer, and the green second electrode layer simultaneously;

wherein the ratio of Ni oxide to mixed metal oxide in the first composite and the second composite after sintering is 0.2 to 0.8 on a volumetric basis.

2. The process as claimed in claim 1, wherein the providing step further comprises:

coating the green membrane layer onto the green supporting electrode layer; and coating the green second electrode layer onto said green membrane layer.

3. The process as claimed in claim 1, wherein the providing step further comprises:

preparing the green supporting electrode layer;

coating the green membrane layer onto said green supporting electrode layer; and coating the green second electrode layer onto said green membrane layer.

4. The process as claimed in claim 1, wherein the green supporting electrode layer, the green membrane layer, the green second electrode layer, or a combination thereof further comprises an organic additive before sintering.

5. The process as claimed in claim 1, wherein the green supporting electrode is formed by extrusion.

6. The process as claimed in claim 1, wherein, after sintering, the mixed metal oxide of the supporting electrode material, the membrane layer, the mixed metal oxide of the second electrode material, or a combination thereof independently comprise a material of formula (I)

$$AZr_aCe_bAcc_cO_{3-y} \quad (I)$$

wherein

A is Ba, Sr, Ca, or a mixture thereof;

the sum of a, b, and c equals 1;

b is from 0 to 0.45;

c is from 0.1 to 0.5;

Acc is Y, Yb, Pr, Eu, Sc, In, or a mixture thereof; and y is a number such that formula (I) is uncharged.

7. The process as claimed in claim 6, wherein A is Ba.

8. The process as claimed in claim 6, wherein Acc is Y.

9. The process as claimed in claim 6, wherein the material of formula (I) is $BaCe_{0.2}Zr_{0.7}Y_{0.1}O_{3-y}$.

10. The process as claimed in claim 1, wherein, after sintering, the mixed metal oxide in the supporting electrode layer is the same as the mixed metal oxide in the second electrode layer.

11. The process as claimed in claim 1, wherein the sintering is performed at a sintering temperature of between 1200 and 1800° C.

12. The process as claimed in claim 1, wherein after sintering, the process further comprises a reducing step.

13. A membrane electrode assembly obtained by the process as claimed in claim 1.

14. A membrane electrode assembly comprising, in the following layer order:

a supporting electrode material comprising a Ni composite of formula $Ni-AZr_aCe_bAcc_cO_{3-y}$, wherein the ratio of Ni to $AZr_aCe_bAcc_cO_{3-y}$ is 0.2 to 0.8 on a volumetric basis;

a membrane layer material comprising $AZr_aCe_bAcc_cO_{3-y}$;

a second electrode material comprising a Ni composite of formula $Ni-AZr_aCe_bAcc_cO_{3-y}$, wherein the ratio of Ni to $AZr_aCe_bAcc_cO_{3-y}$ is 0.2 to 0.8 on a volumetric basis;

wherein, for each material independently,

A is Ba, Sr, Ca, or a mixture thereof;

the sum of a, b, and c equals 1;

b is from 0 to 0.45;

c is from 0.1 to 0.5;

Acc is Y, Yb, Pr, Eu, Sc, In, or a mixture thereof; and y is a number such that the material is uncharged.

15. The membrane electrode assembly as claimed in claim 14, wherein:

the supporting electrode material comprises a Ni composite of formula $Ni-BaCe_{0.2}Zr_{0.7}Y_{0.1}O_{3-y}$;

the membrane layer material comprises $BaCe_{0.2}Zr_{0.7}Y_{0.1}O_{3-y}$; and the second electrode material comprises a Ni composite of formula $Ni-BaCe_{0.2}Zr_{0.7}Y_{0.1}O_{3-y}$.

16. The process as claimed in claim 1, wherein, after sintering, the membrane layer comprises a ceramic mixed metal oxide.

17. The process as claimed in claim 6, wherein, after sintering, the ratio of Ni to the material of formula (I) in the supporting electrode material and/or the second electrode material is from 0.2 to 0.8 on a volumetric basis.

18. The process as claimed in claim 6, wherein $2.75 \leq y \leq 2.95$.

19. The process as claimed in claim 12, wherein the reducing step comprises applying hydrogen or diluted hydrogen gas at a temperature between 500 and 1200° C.

20. The membrane electrode assembly as claimed in claim 14, wherein $2.75 \leq y \leq 2.95$.

* * * * *